E. J. AUGSBERGER.
FLYING MACHINE.
APPLICATION FILED APR. 8, 1909.
953,810.
Patented Apr. 5, 1910.
5 SHEETS—SHEET 5.
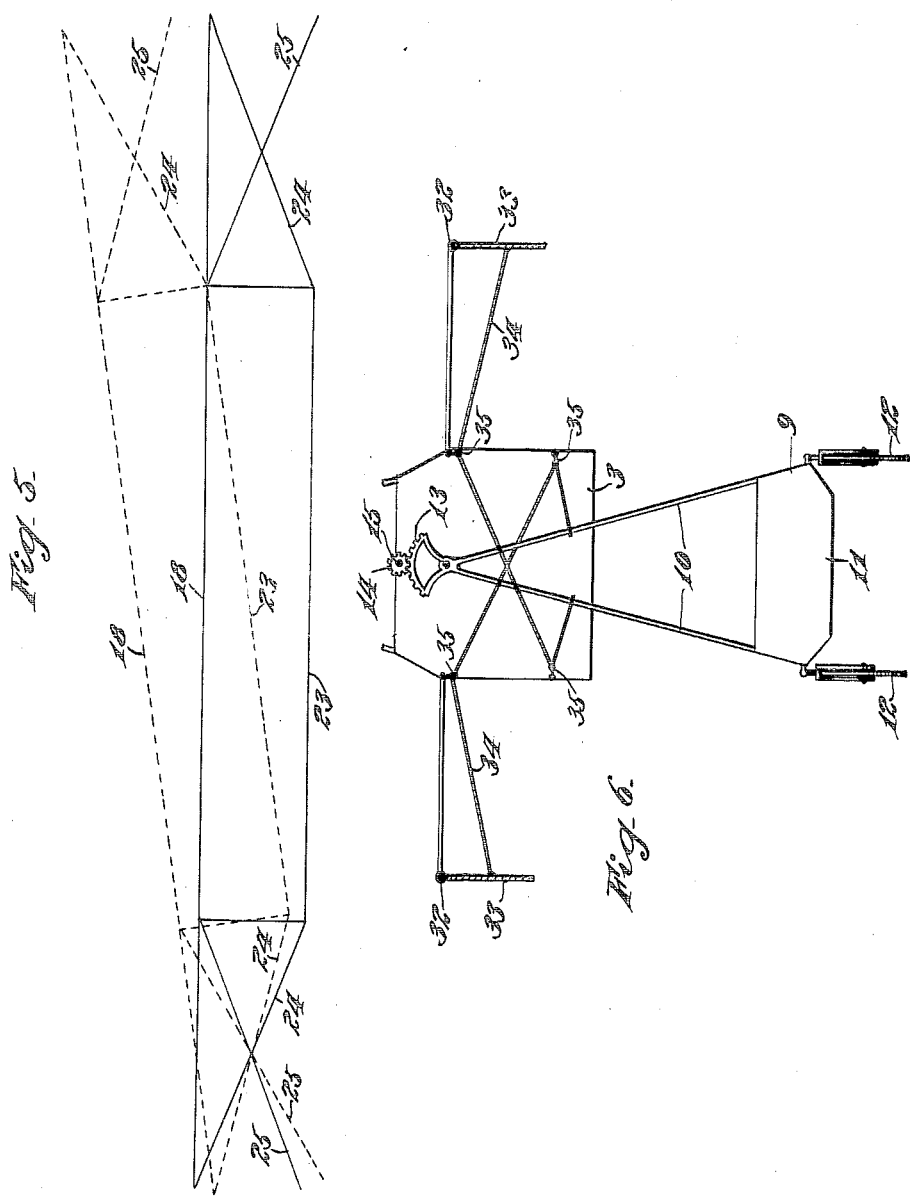

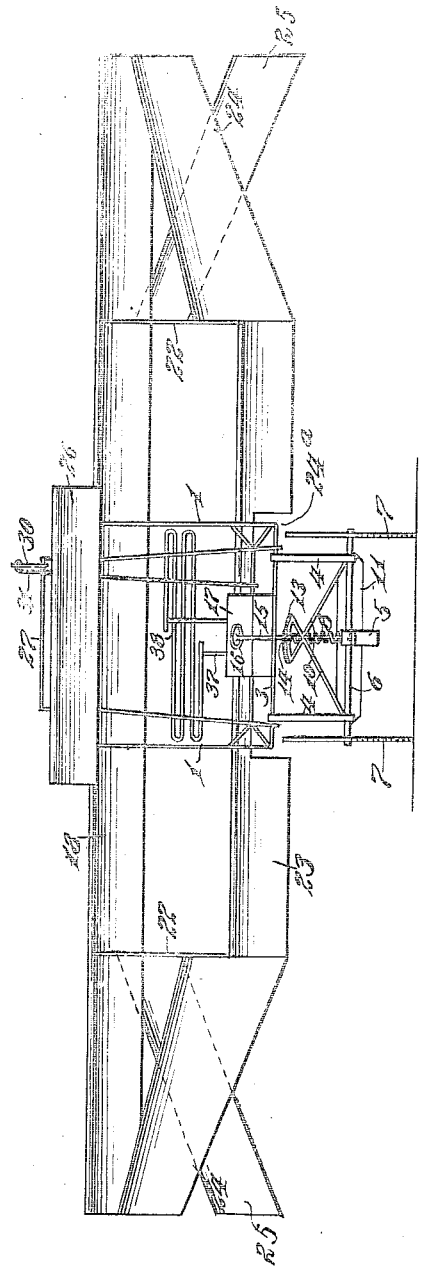

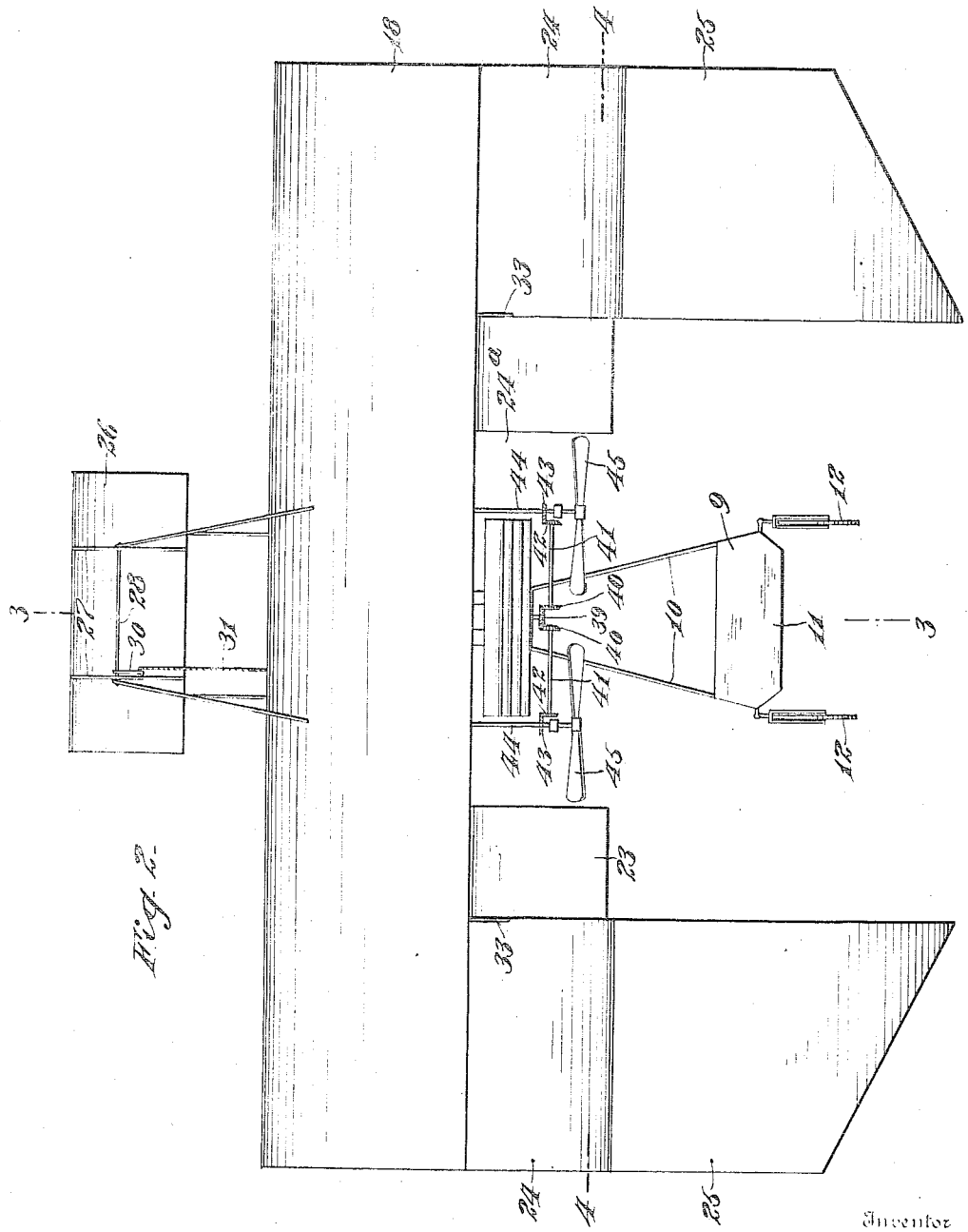

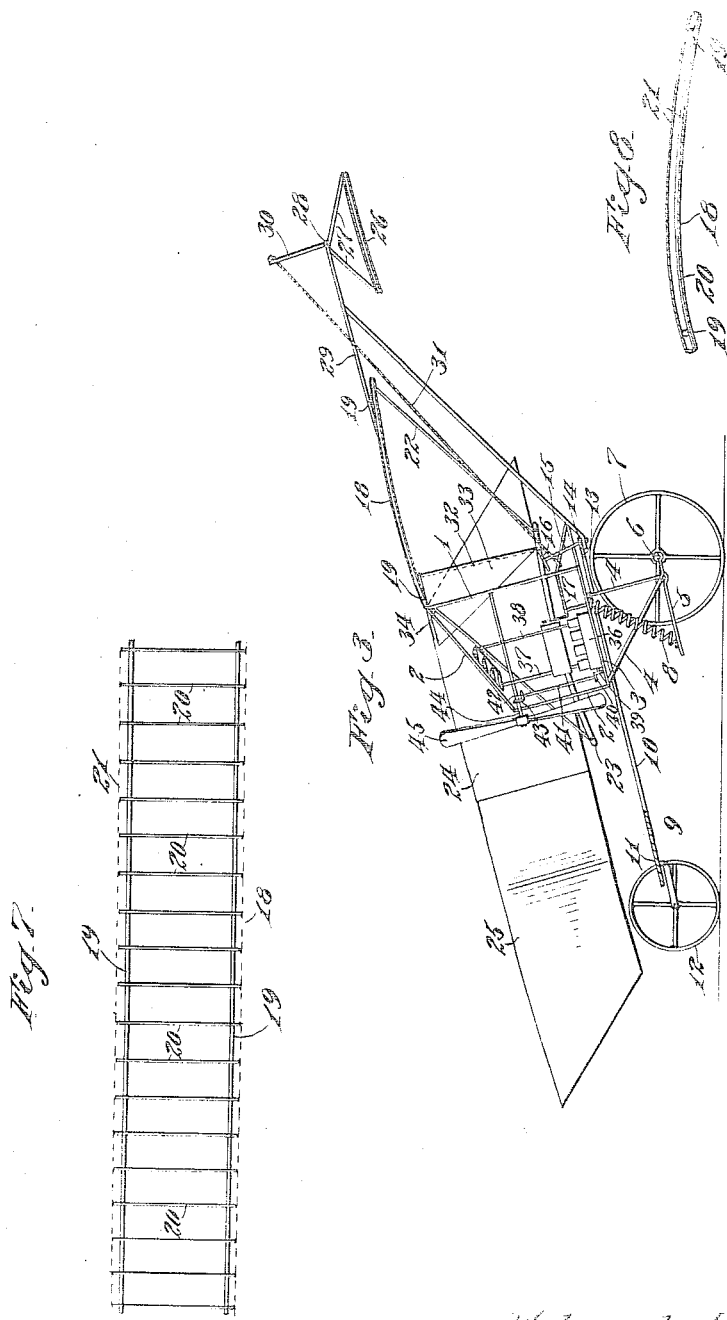

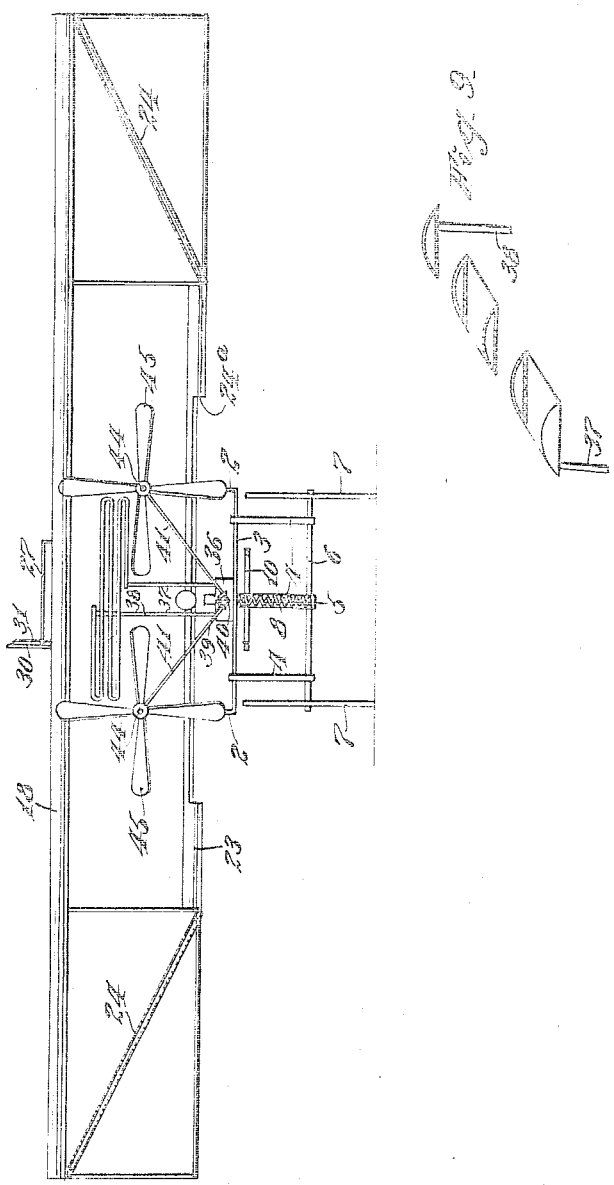

UNITED STATES PATENT OFFICE.

EDWARD J. AUGSBERGER, OF PHILADELPHIA, PENNSYLVANIA.

FLYING-MACHINE.

953,810.   Specification of Letters Patent.   Patented Apr. 5, 1910.

Application filed April 8, 1909. Serial No. 488,681.

*To all whom it may concern:*

Be it known that I, EDWARD J. AUGSBERGER, a citizen of the United States, residing at Philadelphia, in the county of Philadelphia and State of Pennsylvania, have invented certain new and useful Improvements in Flying-Machines, of which the following is a specification.

My invention relates to improvements in flying machines, the object of the invention being to provide an improved flying machine, with an improved arrangement of vanes or planes, which will compel the machine to maintain a horizontal position regardless of the power of the wind, and in the direction in which it comes.

A further object is to provide a flying machine with planes or vanes, which sustain the machine in the air, and which are so arranged that each vane will be supported upon a portion of the air or atmosphere not covered by any of the other vanes.

A further object is to provide an improved arrangement of steering blades or vanes, and improved means for operating them.

A further object is to provide improved wheeled frame work, which will support the machine on the ground, which can be manipulated to guide the machine over the ground, and which will elastically engage the ground when the machine is coming to the ground or alighting.

A further object is to provide improved mounting for the engine, and an improved arrangement of means for driving the propellers.

With these and other objects in view, the invention consists in certain novel features of construction, and combinations, and arrangements of parts as will be more fully hereinafter described and pointed out in the claims.

In the accompanying drawings, Figure 1, is a view in front elevation illustrating my improvements. Fig. 2, is a top plan view. Fig. 3, is a view in section on the line 3—3 of Fig. 2. Fig. 4, is a view in section on the line 4—4 of Fig. 2. Fig. 5, is a diagrammatic view illustrating the normal and unusual positions of the machine. Figs. 6, 7, 8 and 9, are views of various details of construction.

1 represents a central frame, comprising vertical, horizontal and inclined rods or braces 2, upon which a floor 3 is secured, and constitutes the main platform of the machine. This platform is provided with depending bars 4, to the lower ends of which links or levers 5 are pivotally connected between their ends, and at their ends connected to a shaft 6, on which wheels 7 are mounted, and the other ends of levers 5 are connected by coil springs 8 with the floor or platform 3. The purpose for this spring mounting for the wheels is to provide a cushioning effect in alighting, as the wheels will strike the ground and the springs 8 will take up or cushion the shock, and not transmit the same to the flying machine.

9 represents a rudder or steering device, which is preferably made up of rods 10, having a canvas tail portion 11, and to said rods, caster wheels 12 are connected as shown. The forward ends of the rods 10 are secured to a segmental gear 13, and the latter is in mesh with a pinion 14 on a steering shaft 15, to the upper end of which latter a hand wheel 16 is secured, so that the operator upon the seat 17 can by manipulating the hand wheel 16 throw the steering device from side to side, the caster wheels 12 following in proper position to guide the machine over the ground before it begins its flight. This steering device 10 with its tail portion 11 of canvas, is also moved during the flying operation, and assists in steering the machine through the air in guiding it to the left or right, as the case may be, and as will be more fully hereinafter explained.

18 represents a normally horizontal plane or vane. This plane or vane, like all the others hereinafter described, is made up of longitudinal rods 19 and transverse rods 20, holding extended or taut a cover of canvas 21, the covering being made in the form of upper and lower sheets secured together at their edges, and inclosing the rods. This vane or plane 18 is braced by inclined rods 22, and is slightly curved in cross section as shown in Fig. 3, and projects out beyond the platform as shown.

23 represents the lower horizontal plane, which is cut out at its center as shown at 24$^a$, to accommodate the driving mechanism of the ship, and is located above the platform 3, about one fourth of the distance from the same to the upper portion of the frame work, and is also slightly curved as shown. This plane or vane 23, it will be observed is in rear of the upper plane 18, so that the said planes will be supported upon entirely independent portions of the air, and not interfere with the supporting qualities of the air.

At each side of the frame work, front and rear planes 24 and 25 respectively are mounted. These vanes are both curved in cross section, and are both inclined as shown, that is to say, the forward vanes 24 are inclined downwardly from their outer to their inner ends, and the rear side planes 25 are inclined upwardly from their outer to their inner ends, as illustrated most clearly in the diagrammatic view Fig. 5.

26 indicates a normally horizontal steering plane or vane, which is constructed similarly to the other vanes or planes above described, and has a frame work 27 pivotally supported at 28 upon forwardly projecting rods 29, and having an upwardly projecting rod 30. A steering rod 31 is connected to this rod 30, and terminates in proximity to the operator's seat 17, so that by manipulating this rod 31, the incline of the steering plane or vane 27 may be varied to suit. When the forward edge of the plane or vane is tilted upwardly, the machine will ascend, and when tilted in an opposite direction, the machine will descend, and when this plane or vane is in a normal horizontal position, the machine will sail along in the same horizontal plane.

Vertical rods 32 are supported on the frame, and afford hinged mounting for triangular and vertically disposed steering vanes 33. These vanes 33 may be made in various ways, but are preferably of canvas, having suitable supporting structure to hold them taut, and are connected at their upper ends by cords 34, passed through eyes 35 on the frame, and connected to the steering frame 10, so that when the steering frame is moved to right or left, one of the vanes 32 will also be moved. Only one of these vanes is moved at a time as will be readily understood, for when one vane is moved, the other cord will be slack, and the vanes will be held in a normal straight line by the action of the air through which the machine is flying.

To propel the machine through the air, I provide an engine 36 illustrated diagrammatically, and cooled by water in circuit through pipes 37 and 38, the latter arranged in the form of lattice work between which the air will freely pass and cool the water in circuit from the jacket of the engine. The engine transmits motion through the medium of gears 39 and 40, to shafts 41, and the latter through the medium of gears 42 and 43, transmit motion to propeller shafts 44, on which propellers 45 are secured as clearly shown. These propellers serve to drive the machine forwardly, and are always under the control of the operator upon the seat 17.

As shown in Fig. 3, when the machine is supported upon its wheels on the ground, all of the vanes or planes are in a general inclined upwardly position from their rear to their forward edges, so that when the propellers begin to turn, the machine will be moved along the ground until sufficient momentum is attained for the planes to ride up on to the air and leave the ground and sail away, when by manipulating the steering plane 26, the machine can be driven to the desired height, and there progress at the same elevation until it is desired to descend, and by turning the steering wheel 16, the steering vanes 32 and the tail portion 11 will be swung, so as to guide the machine to left or right as desired.

When the machine descends to the ground, the springs 8 will cushion all shock, and allow the occupants to alight without jar and without damage to the machine.

Fig. 5 illustrates diagrammatically in full lines, the normal horizontal position of the machine, and in dotted lines an unusual position which might be occasioned by a sudden gust of air from one side in an upward direction, but the machine will soon right itself, as the forward plane would exert by its cam action against the air, a downward tendency of the upwardly tilting end, and cause the machine to right itself. In other words, these forward and rear side planes or vanes 24 and 25, serve to exert a cam action on the air, as well as a holding or supporting action for the machine, and maintain the machine in a horizontal position, or at least quickly return it to such position, in the event of its becoming tilted by unusual air currents.

Various slight changes might be made in the general form and arrangement of parts described without departing from my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

1. In a flying machine, the combination with a frame, of front and rear side planes at both sides of the frame, one of each pair of side planes inclining downwardly from its outer to its inner end, and the other of said pair of side planes inclining upwardly from its outer to its inner end.

2. In a flying machine, the combination with a frame, of front and rear side planes at both sides of the frame, said front planes inclining downwardly from their outer to their inner ends, and said rear planes inclining upwardly from their outer to their inner ends.

3. In a flying machine, the combination of a frame, upper and lower planes or vanes, supported one in a higher plane than the other, and inclined side planes secured to said frame.

4. In a flying machine, the combination with a frame, of a pair of planes at each side of the said frame, the planes of each pair inclining in opposite directions, a steering plane in advance of the frame, means for tilting said steering plane vertically.

5. In a flying machine, the combination with a frame, of planes secured to and supported by said frame, rods extending upwardly from said frame, a steering plane, upwardly projecting rods on said steering plane pivotally connected to said first mentioned rods, and means for tilting said upwardly projecting rods, whereby the steering plane may be tilted to regulate the elevation of the machine.

6. In a flying machine, the combination with a frame, planes or vanes secured to said frame, vertically disposed steering vanes, having hinged mounting, a steering frame projecting rearwardly from the first mentioned frame and pivotally connected thereto, cords connecting said steering frame with said vanes, a segmental rack on said steering frame, a steering shaft, a pinion on said shaft meshing with said rack, and a steering wheel on said steering shaft.

7. In a flying machine, the combination with a frame, vanes or planes on said frame, rods depending from said frame, levers pivotally secured between their ends to said rods, a shaft supported by the ends of said levers, wheels on said shaft, and an elastic connection between the other ends of said levers and said frame, whereby said elastic connection will cushion the shock of contact with the ground, and a rearwardly projecting steering mechanism on said frame, and caster wheels on said steering mechanism.

In testimony whereof I have signed my name to this specification in the presence of two subscribing witnesses.

EDWARD J. AUGSBERGER.

Witnesses:
R. H. KRENKEL,
J. I. L. MULHALL.